Dec. 29, 1964 T. H. LJUNGGREN 3,163,179
VALVE STRUCTURE IN HIGH PERFORMANCE SERVO SYSTEM
Filed July 28, 1961 2 Sheets-Sheet 1

INVENTOR
THOR H. LJUNGGREN, DECEASED,
BY THELMA L. LJUNGGREN, EXECUTRIX

Dec. 29, 1964  T. H. LJUNGGREN  3,163,179
VALVE STRUCTURE IN HIGH PERFORMANCE SERVO SYSTEM
Filed July 28, 1961  2 Sheets-Sheet 2
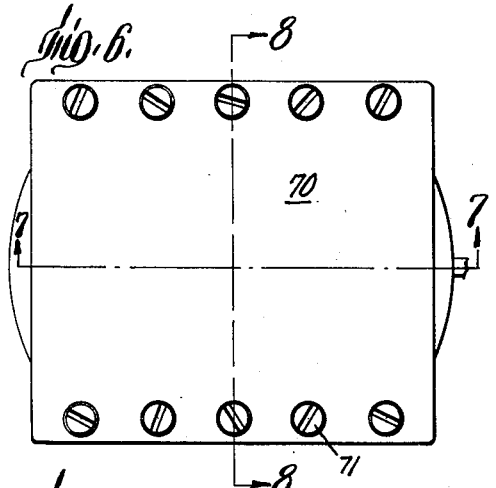
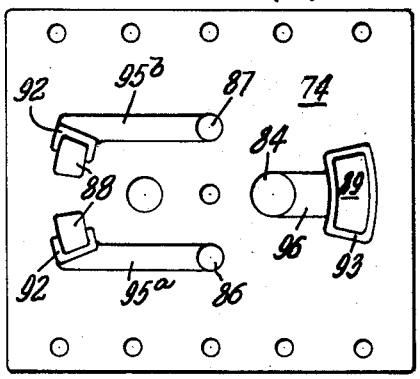
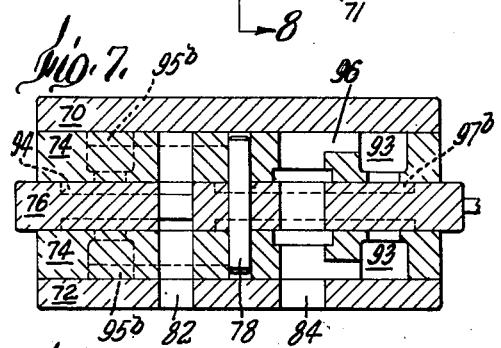
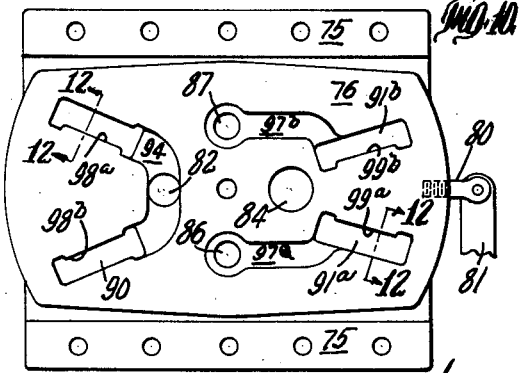
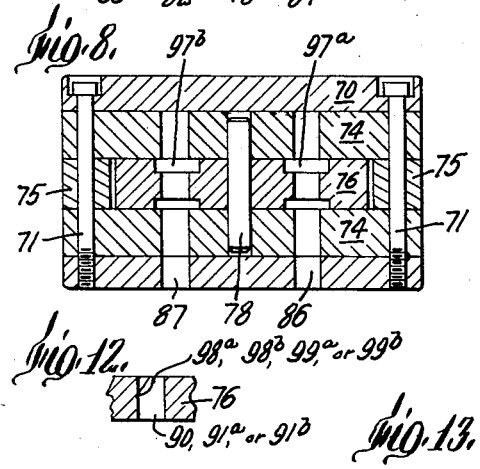
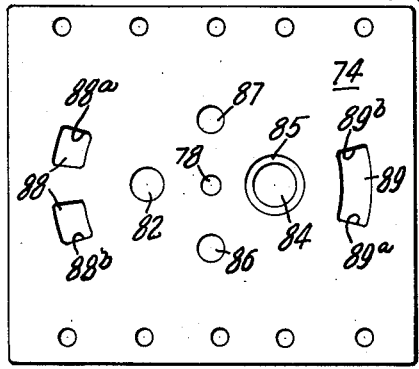
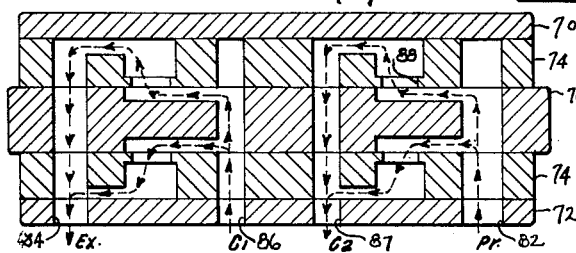
INVENTOR
THOR H. LJUNGGREN, DECEASED,
BY THELMA L. LJUNGGREN,
EXECUTRIX 3,163,179
VALVE STRUCTURE IN HIGH PERFORMANCE
SERVO SYSTEM
Thor H. Ljunggren, deceased, late of Perkinsville,
Vt., by Thelma L. Ljunggren, executrix, Rte. 1,
Perkinsville, Vt.
Filed July 28, 1961, Ser. No. 130,220
4 Claims. (Cl. 137—625.21)

This invention relates to improvements in valves of the type adapted for use with a high performance, pressurized fluid servo system.

In the present development of the servo motor and valve art, there are certain power amplifiers which meet definite requirements and are classified as "high-performance servo systems" (HPSS). To be classified as a high-performance system, the components must be made to meet the highest demands of precision and have characteristics which will secure a constant repeatability in the function of the system with a low-power input signal controlling in a fast and accurate manner the response of a high-power output. The requirements of the high-performance systems, among other things, demand that servo valves of such systems have metering valve parts of constant effective width, so that the response in terms of fluid flow through the metering openings will be linear as the relative movement of the valve uncovers such openings; e.g. as taught in the U.S. Patent to W. C. Moog, Jr., 2,920,650.

Another of the requirements for a high-performance servo system, and one of the most critical requirements, is that of stability and the absence from any tendency toward self-induced oscillations, called "dither." While it is highly desirable that in the operational function of the servo valve there is an absence of any tendency toward self-induced oscillations, such is not inherent in any ordinary type of servo valve; in fact, the opposite proposition is true. That is, common high-pressure servo valves have a tendency to oscillate and, thus, provide inferior performance as to stability. While, in general, moderate care in design should meet the basic demand on the valve for laminar flow, turbulence will always be present on the downstream side of a metering orifice or port just after flow has passed therethrough. Such turbulence will commonly breed hydrodynamic forces which have the effect of opposing the valve opening forces, thereby urging reclosing of the valve by a turbulent flow created force that may exceed any present frictional or inertial forces; thus, in this condition the valve will be unstable. Any movable servo valve member which is affected by turbulent flow forces in this manner may preclude desirable stable single stage operation through an input-command signal from a low-powered actuator.

A number of diverse solutions have been offered for the foregoing problems, but most of these solutions appear to reside in a questionable flow pattern and often require additional valve components to the detriment of the economy of manufacture and simplicity, as well as contributing to severe limitations as to possible miniturization.

In view of the foregoing, it is an object of this invention to provide a flow control valve suitable for exact control of high-pressure fluids, such as used in servo motors and the like, the components of the valve being few and uncomplicated to facilitate economical manufacturing and to exploit the utmost potential of miniturization. It is also an object of this invention to provide a metering valve port of unique construction for the purpose of diminishing turbulent flow on the downstream side of the port, and specifically, to direct the hydrodynamic forces emanating from such turbulence away from the relatively movable component of the valve.

Other objects, features, and advantages of this invention will be apparent from the following detailed description taken in connection with the accompanying drawings wherein:

FIGURE 6 is a plan view of a 4-way valve, illustrating the principles of this invention as applied in a modified form of valve.

FIGURE 7 is a sectional view taken along line 7—7 of FIGURE 6.

FIGURE 8 is a sectional view taken along line 8—8 of FIGURE 6.

FIGURE 9 is a plan view of the valve illustrated in FIGURE 6 with the topmost cover element 70 removed illustrating a stationary valve plate 74.

Figure 4:
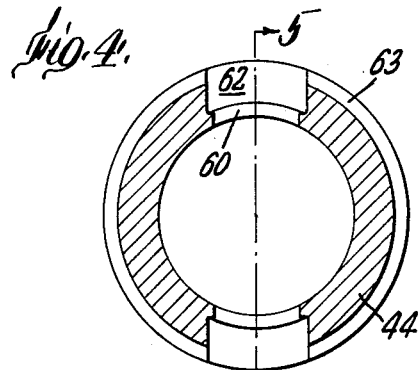
FIGURE 4 is an enlarged sectional view of a valve bushing element 44.
Figure 5:
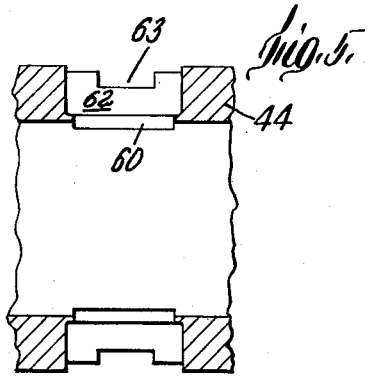
FIGURE 5 is a fragmentary sectional view taken along line 5—5 of FIGURE 4 showing the metering port or orifice in the valve bushing element 44.
Figure 2:
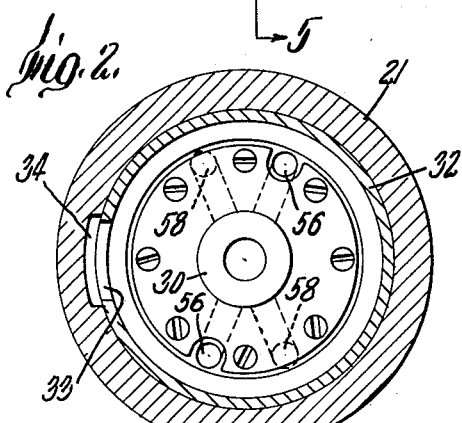
FIGURE 2 is a sectional view taken along line 2—2 of FIGURE 1.

FIGURE 10 is a plan view of the valve of FIGURE 6 with the element 74 removed, showing the removable valve member 76 and spacers 75.

FIGURE 11 is a top plan view of the bottom plate element 74.

FIGURE 12 is a fragmentary sectional view taken along lines 12—12 of FIGURE 10.

FIGURE 13 is a flow diagram of the valve of the FIGURE 6 modification illustrating the balanced flow forces.

In FIGURES 1–5, inclusive, there is illustrated a preferred embodiment of this invention, wherein the novel valve structure of this invention is included in a three-way valve, adaptable to a HPS system, such as described in my co-pending application, Serial No. 33,705, filed June 3, 1960, now Patent 3,045,651 granted July 24, 1962.

A housing 21 is provided with a central bore forming a cylinder in which is slidably mounted a piston 22 of tubular cross-section. End caps 26—26 are secured to the opposite ends of housing 21 in a conventional manner, e.g. by screws 27. Piston rods 28 and 30 are secured to piston 22 at the right and left ends thereof, respectively, as viewed in FIGURE 1. The piston rods include flanged portions so that they may be secured to the piston by screws 29. At least one of the piston rods is hollow from end to end and both piston rods are slidably mounted in bores of caps 26—26 to pass to the outside of the housing.

It can be seen that with the piston and cylinder arrangement, there is formed a pair of expansible chambers 23 and 24 within the cylinder, one at each end of the piston. The cylinder further contains a sleeve 32 provided with cut-outs 33—33 in the ends which are angularly registered with a channel 34 in the housing so that there is a path of fluid communication from a conduit 35 through channel 34 and openings 33 to the expansible chambers 23 and 24. Thus, expansible chambers 23 and 24 are in constant or continual communication with a suitable source (not shown) of fluid under pressure.

The piston 22 also serves as a housing for the novel servo valve structure of this invention. On the piston's exterior, intermediate lands at each end thereof, there is provided a reduced portion forming an annular cavity 38 opening into an exhaust conduit 36 in the cylinder wall 21 and inwardly connecting with a hole 64, located substantially equidistant from the end faces of the piston 22. A valve porting sleeve or bushing 44 is fixedly secured inside the piston 22 and located so that its longitudinal center plane coincides with the corresponding center plane of the piston 22. Within the sleeve 44, a valve slide 46 is slidably mounted. This valve slide is formed as a spool and is provided with a land at each end as well as a central land 51. The spaces between the lands are of reduced diameter, providing annular cavities which, together with the inside of the sleeve 44, provide annular pockets 47 and 49. In longitudinal alignment with pockets 47 and 49, holes 48 and 50 are provided extending through the sleeve 44.

A pair of diametrically opposed passages 56—56 are provided from one end face of the piston 52 with their inner ends in registry with holes 50 thus forming a path for open fluid communication between chamber 23 and pocket 49. Likewise, in the opposite end face, a pair of passages 58—58 are provided registering with holes 48 to provide fluid communication between expansible chamber 24 and pocket 47. As can be seen by comparing FIGURES 1, 2, and 3, there are two passages 56—56 in one end face and two passages 58—58 in the opposite end face. These passages and holes have been displaced angularly in FIGURES 2 and 3 from that shown in FIGURE 1 for the sake of clarity.

Figure 3:
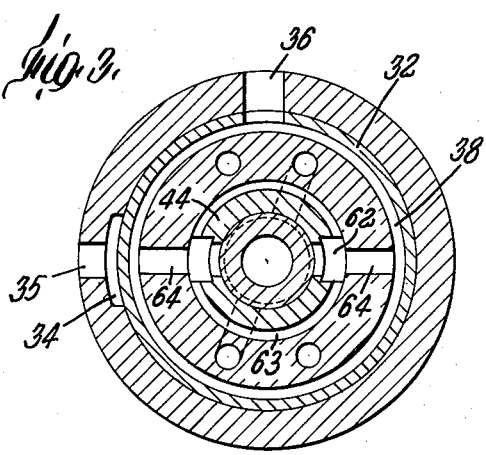
FIGURE 3 is a sectional view taken along line 3—3 of FIGURE 1.
Figure 1:
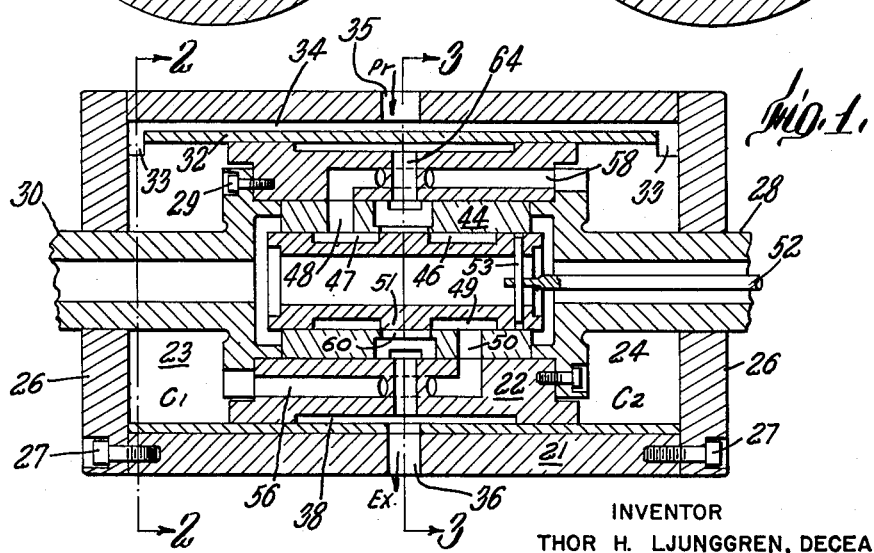
FIGURE 1 is a sectional view taken along the longitudinal axis of a servo system, including a valve constituting the preferred embodiment of this invention.

As shown in FIGURE 3, in the sleeve or bushing 44, there are provided two metering ports, diametrically opposite in location. These ports are shown in FIGURES 1 and 3 and in much more detail in FIGURES 4 and 5. The ports have a metering portion formed as a rectangular aperture 60 opening from the inside diameter of the sleeve or bushing 44 and a larger relieved portion 62 which is larger than the aperture and extends to the outside of sleeve 44. A reduced area in the outside diameter of sleeve 44, together with the interior wall of piston 22, forms an annular passage 63 as shown in FIGURE 3 which, at all times, provides open fluid communication between the metering ports and the exhaust conduit 36. The longitudinal extension of rectangular aperture 60 is substantially equal to the length of land 51, as can be seen in FIGURE 1 where the valve slide is in a neutral or normal or zero position, such that land 51 effectively completely blocks rectangular aperture 60 and no flow occurs through the valve with the result that there is no movement of the fluid motor piston. The valve slide may be moved in either direction away from the neutral position by a control rod 52 attached to the valve slide by pin 53 to cause movement of the servo motor. The control rod 52 extends through the hollow piston rod 28 and the opposite end of rod 52 is secured to a suitable actuator (not shown, but reference may be had to my aforesaid application).

In the operation of the FIGURE 1–5 embodiment, the expansible chambers 23 are constantly supplied with a fluidized pressure medium. In the absence of any control input signal, the valve slide will be in its neutral position as illustrated in FIGURE 1 with the slide central land 51 just covering the metering port 60 and preventing flow of the fluid medium, and, with the pressure in chambers 23 and 24 equalized, the movement of piston 22 is brought to a standstill. Assuming now an input signal is produced in such a manner that valve slide 46 is constrained to move in the direction of piston rod 30 then, central land 51 will uncover port 60 a pre-determined degree, thereby establishing a flow path from expansible chamber 23 through conduits 56—56, hole 50, pocket 49, uncovered ports 60—60, hole 64, cavity 38, and out through exhaust conduit 36, resulting in a pressure drop in chamber 23, and, because of the sustained pressure in chamber 24 the piston will be propelled toward the left as viewed in FIGURE 1.

By reversing the sense of the input signal, a pressure drop is produced in chamber 24 by a flow path from expansible chamber 24 through conduits 58—58, holes 48, pocket 47, uncovered ports 60—60, holes 64, cavity 38, and out through exhaust conduit 36, thus causing the piston 22 to move toward the right as viewed in FIGURE 1.

The movement of the piston is governed by the area uncovered in the metering port, i.e., the area of rectangular orifice 60 uncovered by equal length land 51. Thus, for each increment, the valve slide is moved, a corresponding and proportional incremental velocity change will take place because of the rectangular shape of the metering port 60.

One of the important novel features of this invention resides in a particular configuration of the metering port 60 with the straight-edged border of the port aperture benig comparatively narrow in the direction of flow, followed by a relieved or recessed port 62, i.e., a portion of greater cross-sectional area than the aperture 60. This results in a flow measuring means which will be weir-shaped with all the ensuing advantages characteristic of a weir, including diminishing turbulence. Furthermore, by arranging the flow path so that the pressure drop and any possible turbulence takes place on the downstream side of the metering port 60, the force generated by any such turbulence can only react against a fixed component, i.e., fixed bushing or sleeve 44 of the valve, instead of against the movable valve slide 46. This arrangement has the effect of substantially eliminating the critical and dangerous oscillatory forces which tend to decrease the stability of the known prior HPS system servo valves.

The preferred embodiment of FIGURES 1–5 described above is in combination with a three-way valve adapted for coaxial movement relative to an expansible chamber, providing a double-acting rectilinear movable fluid motor with features suitable for a high-performance system and where the valves' rugged and simple components and the irreducible minimum of pipe connections favor the utmost in miniaturization. However, for one skilled in the art, it will be apparent that the inventive features disclosed are also applicable to other types of servo valves, such as four-way valves as well as the conventional devices where the motor and valve are separate and independent structures.

FIGURES 6–12, inclusive, illustrate another embodiment of this invention, in which the inventive features are applied to a four-way valve of the type that may be termed a "plate valve" or "disc valve," as distinguished from the "spool valve," shown in FIGURES 1–5. The plate valve illustrated and described in FIGURES 6–12 includes a plate valve slide 76 slidably rockable between two parallel-spaced plates 74 containing ports. The plates 74 are similar but opposite hand in construction. The plates 74 are separated by spacers 75—75 to allow a sliding fit for movable valve slide or disc element 76 which is journaled on for a rocking movement about a dowel 78. The dowel 78 is secured to and carried by plates 74—74. The plate valve assembly is completed by a top cover plate 70 and a bottom plate 72. Several screws 71 passing through the elements 70, 74, 75, 74, and threaded into the bottom plate 72 constitute the means for holding the elements into a unitary assembly.

At one end of the valve slide 76, there is provided a forked eye-bolt 80 to provide a hinged connection with a control rod 81. The outer end of control rod 81 is connected to a suitable actuator (not shown) that may supply a force to move the slide 76 in a predetermined direction away from its neutral position.

As shown in FIGURE 7, at one side of the center dowel 78 and on the longitudinal center plane of the valve, there is a hole 82 provided through the elements 72, 74, 76 and 74. The outer opening of hole 82 is connected to a suitable source (not shown) of pressurized fluid medium. In a similar manner, hole 84 is provided on the opposite side of dowel 78 and serves as an exhaust outlet for the valve.

As seen in FIGURE 8, a plane taken transverse to the longitudinal axis of the valve, on each side of center dowel 78 holes 86 and 87 are provided through elements 72, 74, 76 and 74. The free ends of holes 86 and 88 are connected to the expansible chambers of a fluid motor (not shown).

FIGURE 9 shows a top plane view of the top fixed valve plate 74, and FIGURE 11 the top plane view of bottom valve plate 74. The valve slide 76 is illustrated in FIGURE 10. Shallow channels 94—94 in valve slide 76 connect inlet passage or aperture 82 with relief cut-outs 90—90 which cut-outs are shown in detail in FIGURE 12. One of the cut-outs is bordered by an extending edged portion 98a and the other cut-out by an extending edged portion 98b, these edges extending from the pivotal center of the valve in a radial manner, and are angularly spaced equally from the longitudinal axis of the valve. A shallow channel 97a in valve slide 76 connects the hole or aperture 86 with a cut-out 91a and a similar channel 97b connects hole or aperture 87 with cut-out 91b. The cut-out 91a is bordered by an edge 99a and cut-out 91b is bordered by an edge 99b; and, these edges are arranged in a manner similar to that described for edges 98a and 98b and edge 99a as shown in FIGURE 12.

In FIGURE 11 apertures 88—88 are shown for forming metering ports and also shown is an aperture 89. The side edges of these metering ports 88a, 89a, 88b and 89b are located radially with regard to the center of dowel 78 and are angularly spaced from the longitudinal axis. The side edges of the ports 88a, 88b, 89a and 89b further register with the rims 98a, 98b, 99a and 99b when the valve slide is in neutral position, i.e., with the longitudinal axis of slide 76 coinciding with the longitudinal axis of the assembled valve.

FIGURE 9 illustrates how the apertures 88—88 open in to relieved portions 92—92 while aperture 89 is surrounded by a relieved portion 93. These relieved portions are also shown in FIGURE 7. A shallow channel 95a connects aperture 86 with hole 88, while channel 95b connects hole 87 with aperture 88. Another shallow channel 96 connects aperture 89 with outlet hole 84.

With the valve slide 76 in the neutral position, axially aligned with the axis of the valve, no fluid flow occurs through the valve and the high-pressure system governed by the valve is in a state of rest. With this condition, the fluid inlet through passage 82 passing through channels 94 and the valve slide 76 is blocked from entering apertures 88 by the fact that the rims of the apertures 88a and 88b correspond with the rims of the channels 98a and 98b, thus preventing any fluid flow further toward the exhaust passage.

Assuming now that an outside signal actuates the control rod 81 causing the slide 76 to be rocked an amount in the clockwise direction, then the edge portion 98b will move away from its alignment with the rim 88b and uncover a substantially rectangular port, thereby permitting fluid under pressure to pass from the supply through inlet hole 82, channel 94, aperture 88, channel 95a, to hole 86, connected to an expansible chamber (not shown) of a controlled fluid motor (not shown). At the same time, the edge portion 99b will move away from the rim 89b to provide another rectangular port opening thus permitting pressurized fluid medium from an expansible chamber of a fluid motor to be exhausted through hole 87, channel 97b, aperture 89, channel 96, to the exhaust hole 84. If the valve slide 76 were caused to rock about dowel 78 in a counter-clockwise direction, the flow of the fluid medium would be in the opposite direction, as shown in FIGURE 13. That is, one expansible chamber will be supplied with pressurized fluid by way of hole 87 now in fluid communication with inlet 82, while the other chamber is connected by way of hole 86 now in fluid communication with exhaust opening 84.

FIGURE 13 illustrates the fluid flow through the valve and it can be seen that the flow is balanced on both sides of the movable valve member 76.

The FIGURES 6–12 embodiment utilizes a rockable valve slide in a plate valve structure and thus combines simple elements, economical to manufacture and which are the least susceptible to malfunction during service and operation. Other types of valve slide movements will appear feasible to those skilled in the art; e.g., substituting a rectilinear displacement of the valve slide for the above-described oscillating or arcuate movement. However, a rectilinear displacement could only be done by sacrificing some of the favorable characteristics of the rockable slide. The valve slide may be suspended between fixed porting plates by hydrostatic means well known in the art and the active portions of the metering ports, exposed to wear by abrasive particles suspended in the fluid medium, may be hardened or hard-surfaced.

It is noted, however, that in both embodiments the movable valve element or member upon its movement opens a rectilinear flow passage for control of the pressurized medium in a linear manner and the flow passage opened is relieved immediately past the opening to provide for decreased turbulence and to take up the shock of any turbulence which does occur on stationary member of the valve. Such is the purpose of the valve edges and the plate valve and the relieving beyond the metering ports.

From the above it should be clear that the present invention contributes an advancement to the art of high-performance servo system valve structures, including a novel construction for metering the fluidized pressure medium in such a manner that the effect of any force created by turbulence is directed toward the fixed elements of the valve body thus preventing any dangers in critical forces from reacting against the valve slide, causing self-induced oscillation or drifting. The shape of the weir-like metering ports offers a desirable short flow path inductive to diminishing the magnitude of turbulence which occurs on the downstream side of the metering port. The valve components are further rugged and simple in design and the construction holds to a minimum the critical dimensions required for construction. Furthermore, the valve components in the constructions illustrated will be comparatively unaffected by thermally caused expansion and contraction, thus further contributing to the economy of manufacturing and efficiency of operational maintenance. All of the above recited factors and structure, furthermore, are favorable in meeting the stringent requirements of extreme miniaturization.

It is understood that certain features and sub-combinations of utility of the invention described may be employed without reference to other features and sub-combinations. This is contemplated by the scope of the appended claims, and it follows that various changes may be made in detail by those skilled in the art within the scope of the appended claims without departing from the spirit of this invention.

Having thus disclosed and described my invention, I claim:

1. A valve for a high performance pressurized servo system, the valve comprising: at least one relatively fixed valve plate containing at least one channeled fluid passage therein for the flow of pressurized fluid therethrough, a rockable slide plate slidable against the fixed valve plate, the slidable valve plate having at least one aperture, the rockable slide plate movable upon command to control pressurized fluid flow through the passage for control purposes, means defining a port in the relatively fixed valve plate at the termination of the channeled fluid passage adjacent the aperture in the rockable slide plate to thereby control the flow of pressurized fluid, the port in the fixed valve plate opening adjacent the rockable slide plate and the aperture of the rockable slide plate adapted to cooperate with the port opening being of rectilinear shape in the direction of movement of the slide plate such that equal incremental movement of the rockable slide plate uncovers a corresponding linearly related equal increment of area of the port, means defining a rectilinear side edge on the port of the channeled fluid passage, the edge walls immediately behind the edge in the direction of fluid flow being relieved to provide a greater area than the port opening to diminish turbulence and so that diminished turbulence which does exist will act upon the relatively fixed valve plate thus preventing unstabilizing oscillatory forces from acting upon the rockable slide plate.

2. A valve as defined in claim 1, wherein the valve is a four-way valve of the plate valve type, and wherein there are a pair of valve plates each with channeled passages therein, and further wherein the rockable slide plate is sandwiched between the pair of fixed valve plates and slidable thereagainst.

3. A valve as defined in claim 2 wherein the channeled passages in the pair of valve plates extend radially from a center of rocking movement of the rockable slide plate, and further comprising a pin secured to the pair of fixed plates about which the rockable slide plate is rockable.

4. A valve as defined in claim 3 wherein pressurized fluid during its flow through the valve passes equally on both sides of the rockable valve member, thus providing pressure balance to fluid flow.

References Cited in the file of this patent
UNITED STATES PATENTS

| | | |
|---|---|---|
| 1,030,105 | Martin | June 18, 1912 |
| 1,675,307 | Dake | June 26, 1928 |
| 2,079,041 | Ryan et al. | May 4, 1937 |
| 2,203,939 | Barrett | June 11, 1940 |
| 2,209,418 | Overbeke | July 30, 1940 |
| 2,526,361 | Johnson | Oct. 17, 1950 |
| 2,582,088 | Walthers | Jan. 8, 1952 |
| 2,709,421 | Avery | May 31, 1955 |
| 2,771,907 | Joy | Nov. 27, 1956 |
| 2,875,782 | Shih-Ying Tee | Mar. 3, 1959 |
| 2,917,078 | Floyd | Dec. 15, 1959 |
| 2,920,650 | Moog | Jan. 12, 1960 |
| 2,924,239 | Bjorklund | Feb. 9, 1960 |
| 2,953,162 | Ainsworth | Sept. 20, 1960 |
| 2,964,023 | Meulendyk | Dec. 13, 1960 |
| 2,981,288 | Strader | Apr. 25, 1961 |
| 2,985,190 | Kettering | May 23, 1961 |
| 2,987,050 | Oppenheimer et al. | June 6, 1961 |

FOREIGN PATENTS

| | | |
|---|---|---|
| 3,631 | Great Britain | Sept. 10, 1879 |